United States Patent [19]

Beardsley

[11] Patent Number: 5,239,771
[45] Date of Patent: Aug. 31, 1993

[54] WINDOW FLY TRAP

[76] Inventor: Leita R. Beardsley, Rte. 1 Box 189, Three Forks, Mont. 59752

[21] Appl. No.: 842,223

[22] Filed: Feb. 26, 1992

[51] Int. Cl.⁵ .............................................. A01M 1/24
[52] U.S. Cl. ........................................ 43/119; 43/122
[58] Field of Search ............... 43/107, 109, 118, 119, 43/122, 121

[56] References Cited

U.S. PATENT DOCUMENTS

| | | | |
|---|---|---|---|
| 263,222 | 8/1882 | Reynolds | 43/107 |
| 632,303 | 9/1899 | Wuerfel . | |
| 673,919 | 5/1901 | Muzzy | 43/119 |
| 686,447 | 11/1901 | Fritsch | 43/119 |
| 866,398 | 9/1907 | Stein . | |
| 1,073,190 | 9/1913 | Waggoner | 43/119 |
| 1,120,046 | 12/1914 | Fritsch . | |
| 1,131,535 | 3/1915 | McLean et al. . | |
| 1,313,986 | 8/1919 | Hardin | 43/118 |
| 1,335,041 | 3/1920 | Byers et al. . | |
| 1,455,782 | 5/1923 | Faes | 43/119 |
| 1,485,867 | 3/1924 | Mooney | 43/121 |
| 1,812,512 | 6/1931 | Carballo | 43/107 |
| 1,870,712 | 8/1932 | Crown . | |
| 2,153,713 | 4/1939 | Elane | 43/107 |
| 2,741,066 | 4/1956 | Conway | 43/121 |

Primary Examiner—Richard K. Seidel
Assistant Examiner—James Miner

[57] ABSTRACT

A fly trap having a plurality of baffles to guide flies through an aperture into a housing body. Inside the housing is a plurality of entry chambers, passageways and a storage chamber. A hood obscures the exit from the storage chamber. Access holes into hollow baffles expand the fly storage chamber. A transparent back has inclined portions to discourage fly exit. The back is partially coated on the exterior side with adhesive for positioning the trap on insect travel paths.

10 Claims, 2 Drawing Sheets

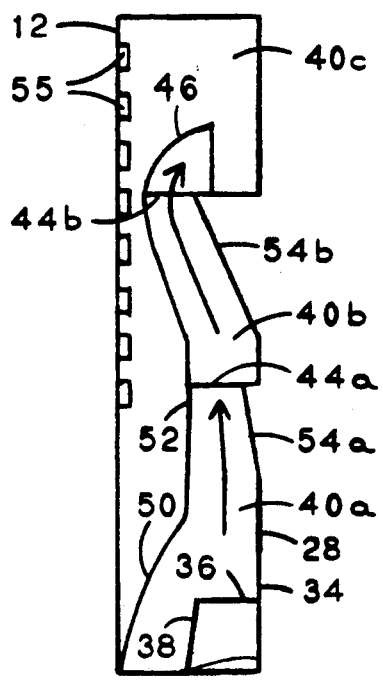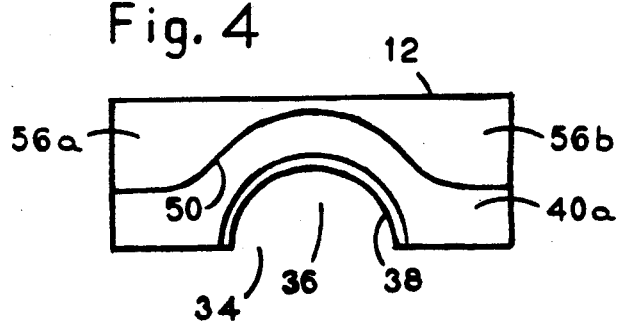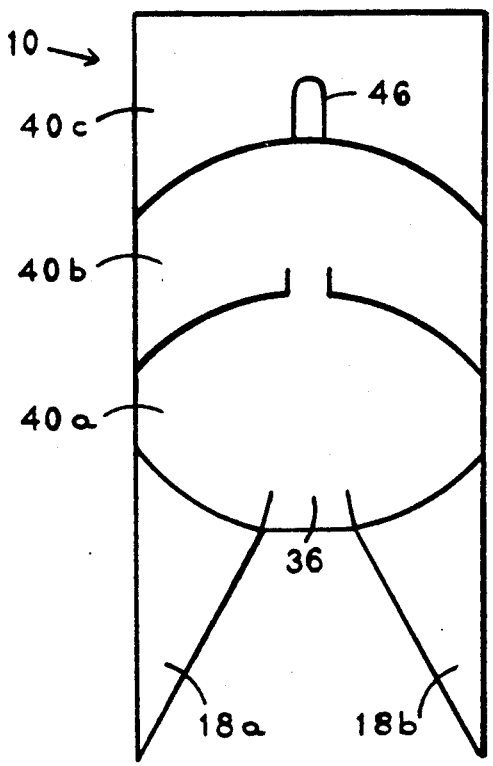

WINDOW FLY TRAP

FIELD OF THE INVENTION

This invention relates to fly traps, specifically to a trap for placement on window panes.

BACKGROUND—DISCUSSION OF PRIOR ART

Heretofore, many fly traps have been constructed by using different combinations of baffles, cones, chambers, fly adhesives, baits, insecticides and the like. Typical prior art is exemplified by patents such as U.S. Pat. No. 632,303, Sep. 5, 1899, of E. Wuerfel, U.S. Pat. No. 866,398, Sep. 17, 1907, of G. W. Stein, U.S. Pat. No. 1,120,046, Mar. 30, 1920, of J. Fritsch, and U.S. Pat. No. 1,131,535, Mar. 9, 1915, of L. D. and G. B. McLean. Wuerfel and Fritsch have, besides other differences from this present invention, two-part traps with multiple leaders, cones, chambers and the like. Wuerfel's trap has no back. Fritsch's trap has a transparent plate. Stein suggests using fly adhesive which limits fly storage to the surface size of the adhesive. And Stein and the McLeans have, besides other differences, traps with storage space limited only to the height of the cones. And, as a part of the development of the present invention, it has been observed that flies can and do exit cones. They tend to stop facing upwards at, or near the top of an object such as a cone. They can then make a 90 degree turn into the cone and exit the trap. A large number of previous traps rely on a cone, or multiple cones to restrain flies. Stein's cones have wires or prongs extending inwardly, however, a fly can easily step onto a wire or prong. Wuerfel's final exit is protected with membrane or hairs, both of which necessitate an additional piece to be manufactured and assembled. Many chamber-type traps, such as those mentioned above, are so complex that to manufacture them at a competitive market price would be virtually unfeasible. The traps have also, for the most part, been unsightly. Both for environmental and manufacturing reasons, such devices have not found a high and lasting level of acceptance.

OBJECTS AND ADVANTAGES

Accordingly, a principle object and advantage of this invention is to provide a trap that is functionally effective for catching flies. The trap can be made of plastic by injection molding, vacuum forming, or other mass manufacturing processes. It is designed for manufacturing ease which would make it available at a marketable price. A hood, which will be explained below, is an advantage because it is designed with manufacturing in mind yet makes fly escape very unlikely. As mentioned above, a person skilled in the art of retaining flies knows it is necessary to have more than an unprotected exit, such as a cone, to prevent flies from escaping. Entrapped flies seriously search for an escape and over a period of a day or more many flies get out of a trap if the exit is not protected. By using plastic forming processes as mentioned above, the entire trap can be made in three parts: the back part including the floor, the sides and the baffles, the inside part, and the front part which includes the baffle fronts. The inside part, which includes the hood along with the chamber partitions, diverting baffles and entry chambers cover can be lifted straight off a mold, as can the exterior parts. The trap can be assembled rapidly without being labor intensive. The baffle construction is an advantage because of the hollow design which results in a rigid baffle that provides a fly storage area via a baffle access hole. Also, vacuum forming, injection molding and possibly other plastics manufacturing methods are advantageous in that the finished product is flexible, lightweight and quite impervious to direct sunshine or freezing. The plastic is preferably smooth, therefore hardly any noise from insect movement is audible.

The fly trap of this invention is designed to attach to a window pane. The trap has a back which helps maintain clean glass by confining flies, thus avoiding fly spots and the smudges caused by swatting flies. In one preferred embodiment, it is designed to be camouflaged to resemble a window ornament. In another embodiment it is plain and unobtrusive. The trap exterior is preferably made in colors both to hide, or partially hide flies as well as attract them. According to the Montana State University entomology department, flies are attracted to colors such as red and yellow. Colorful translucent flowers, animals, designs or pictures in different shapes, make attractive trap exteriors and are very bright like stained glass when the sun shines on them. A trap that is attractive is likely to be left in place after the main fly season and thereby help solve the problem of the unpredictable appearance of flies, such as cluster flies, on warm winter and spring days. This trap does not need fly adhesive, bait, insecticides and/or attractants, though they can be used. The trap, secured on insect travel paths, intercepts and collects flies, millers, hornets, mosquitos and whatever else might be crawling up a window pane. It has an improved fly catching and restraining mechanism with an adequate storage area for entrapped flies. Adhesive, preferably a repositionable adhesive, on the exterior back of the trap, provides a means of easily positioning and removing the trap for emptying, relocating or disposing of it. This trap works very well and is a convenient, sanitary and economical means to fulfil a long felt but unsolved need.

With the above and other objects in view, which will appear as the description proceeds, the invention resides in the combination and arrangement of parts and in the details of construction described and claimed, it being understood that changes in the preferred embodiment and variation of the preferred embodiment of the invention herein disclosed, may be made within the scope of what is claimed, without departing from the spirit of the invention.

DESCRIPTION OF DRAWINGS

FIG. 1 shows a perspective view of a preferred embodiment of the invention in an application phase.

FIG. 2 is a back view of FIG. 1, the back being the transparent floor for the flies. The interior chambers are shown through the floor.

REFERENCE NUMERALS IN DRAWINGS

| FIG. 1 | FIG. 2 continued: |
|---|---|
| 10 fly trap | 42b chamber partition |
| 12 front | 44a passageway |
| 14 housing body | 44b passageway |
| 18a baffle | 46 hood |
| 18b baffle | 48a diverting baffle |
| 20a baffle front | 48b diverting baffle |

Figure 3:
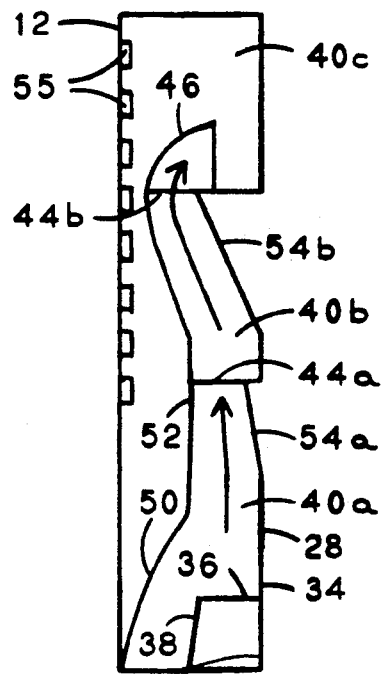
FIG. 3 is a view in detail of the portion indicated by the section lines 3—3 in FIG. 2.
Figure 4:
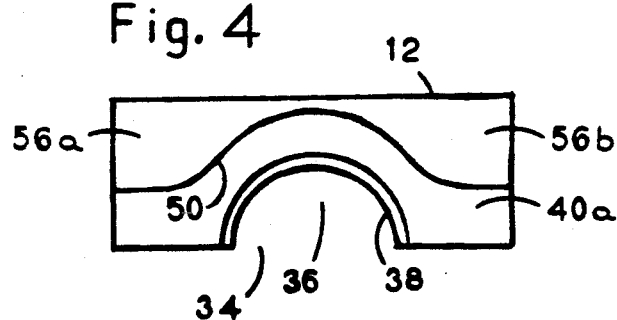
FIG. 4 is a view in detail of the portion indicated by the section lines 4—4 in FIG. 2
Figure 5:
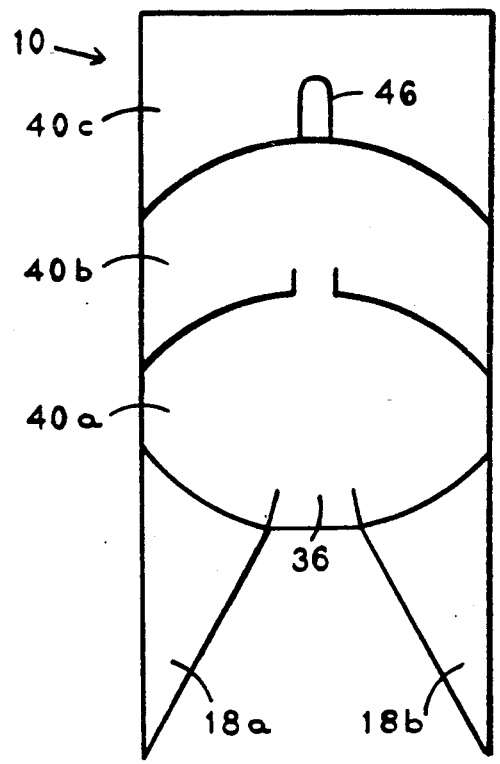
FIG. 5 is a back view of a variation of the invention.

| | |
|---|---|
| 20b baffle front | FIG. 3 |
| 22 window pane | 50 aperture dome |
| 24 window sash | 52 entry chambers cover |
| 26 hinged | 54a inclined floor |
| FIG. 2 | 54b inclined floor |
| 28 transparent floor | 55 ventilation holes |
| 30 adhesive | FIG. 4 |
| 32 cleanout hole | 56a baffle access hole |
| 34 entry notch | 56b baffle access hole |
| 36 aperture | FIG. 5 |
| 38 aperture flange | Like numerals are given |
| 40a entry chamber | to the same parts as |
| 40b entry chamber | shown in FIGS. 1-4. |
| 40c storage chamber | |
| 42a chamber partition | |
| Continued next column: | |

DESCRIPTION OF THE INVENTION

Like numerals of reference indicate the same parts throughout the figures.

Referring to the drawings, FIG. 1 shows fly trap 10 adhered to window pane 22. To attract and to hide flies front 12 of the trap is preferably formed of brightly colored, translucent plastic made to resemble a decoration such as stained glass. Silk screen painting may be used to add several colors. The size of housing body 14 is preferably, approximately 80 millimeters in diameter and 20 millimeters in height. The housing body is the main part of the trap, excluding baffles, which is defined by, and which includes the sides of the trap, it being understood the front and back are in place. A trap this size, including the storage area in the baffles, will hold approximately 500 flies. The trap has two baffles 18a and 18b is shown positioned adjacent window sash 24. FIGS. 1 and 2 show that the baffles each have a baffle front 20a and 20b. The baffle front is larger than the baffle which creates an overhanging edge to discourage flies from crawling over it.

FIG. 2 is a back view of the trap through transparent floor 28. The floor is the back of the trap. The back is partially coated with adhesive 30. Cleanout hole 32 is provided in the floor of the storage chamber. Entry notch 34 is cut out of the floor adjacent aperture 36. The aperture is provided with aperture flange 38. Inside the housing body is entry chamber 40a, entry chamber 40b and storage chamber 40c. The three chambers are separated by chamber partitions 42a and 42b. The partitions have passageways 44a and 44b positioned to facilitate the advancement of flies into storage chamber 40c through hood 46. Diverting baffles 48a and 48b are positioned on each side of passageway 44a to deflect a fly away from making a possible exit back through the passageway.

The section view in FIG. 3 is shown without baffle 18a. Starting at the lower part, the figure shows semi-circular aperture flange 38 extends aperture 36 into entry chamber 40a. Aperture dome 50 is rounded over the aperture. The dome is part of entry chambers cover 52 and is also shown in FIG. 4. The entry chambers cover is attached over both of the entry chambers thereby separating them from storage chamber 40c. Transparent floor 28 is the back of the trap that fits against the window pane. FIG. 3 also shows chambers 40a and 40b with inclined floor 54a and 54b and how they provide a smooth advancement for flies traveling in the direction of the arrows to go through passageways 44a and 44b and through hood 46 into storage chamber 40c. Ventilation holes 55 are provided for air flow.

The section view in FIG. 4 shows aperture dome 50 rounded over aperture 36. A side view of the dome is shown in FIG. 3. Baffle access holes 56a and 56b connect the storage chamber in housing body 14 to the inside of baffles 18a and 18b to provide additional storage area, effectively extending storage chamber 40c into the baffles.

FIG. 5 shows a back view of a variation of the trap shown in FIGS. 1-4. The reference numerals for the parts are the same as explained in the previous figures. The transparent back which is the floor for the flies, is not shown in FIG. 5. It is shown in FIGS. 2, 3 and 4 and can easily be adapted to modified versions of the trap. The trap in FIG. 5 preferably has an unobtrusive front such as a white one or a color to match the window sash. It is a shape variation of the preferred embodiment and is not explained further.

OPERATION OF INVENTION

This invention is based on the general knowledge that flies are attracted to light sources and therefore congregate on window panes. They tend to crawl up the window pane, buzz down and crawl up again and again. Most of their time on the window pane is spent in the upper area of the window on the side with the most light. The adhesive on the back of the trap makes it possible and convenient to attach a trap by simply pressing it to the window pane, and to remove it by simply lifting it up. It is the positioning of the trap near the top of a window that intercepts and collects the flies. The trap can also adhere to screens, walls, light fixtures and other surfaces.

As shown in FIG. 1, trap 10 is adhered to window pane 22 with front 12 facing into the interior of a room. Baffles 18a and 18b are connected to housing body 14 to guide flies into the trap. The trap can be placed on either side of the window, however, baffle 18b is shown adjacent window sash 24. For best results one baffle should be adjacent the sash because flies tend to crawl up the window pane near the sash. As shown in both FIGS. 1 and 2, baffle fronts 20a and 20b are larger than baffles 18a and 18b which produces an overhanging edge which discourages flies from crawling over the baffles.

The operation of the fly trap shown in FIGS. 2 and 3 are explained simultaneously. The back view of FIG. 2 shows how baffles 18a and 18b angle toward aperture 36 which channels flies that are crawling up the window pane into the trap. Entry notch 34 is an area cut out of transparent floor 28 in entry chamber 40a. The notch is cut out of the floor because flies hesitate, or simply refuse, to step up onto an abrupt edge. The notch is also advantageous because once the flies are inside the trap they tend to loose their inhibitions. The floor for the flies is the back of the trap. The floor is transparent because the main purpose of the flies at this time is to escape out through the window from the confines of the room they have been in. It is necessary to have a back on the trap to contain flies when the trap is removed from the window. A cleanout hole 32 is provided in the floor so a consumer can easily vacuum or shake out the contents of the trap making it re-usable if desired. The hole can be made by perforating a circle in the floor of the trap and the consumer can punch it out when cleaning is desired. The trap can be re-used with the window pane sealing cleanout hole 32. Adhesive 30 secures the trap to the window pane. As the flies proceed through the entry notch onto the floor in entry chamber 40a they come into contact with chamber partition 42a. They tend to follow it around until they either go through passageway 44a or encounter aperture flange 38. The flies usually turn upward when they encounter flange 38, however, they can crawl over it because of aperture dome 50, which is also shown in FIG. 4. They continue around the chamber partition to passageway 44a which they will most likely pass through into entry chamber 40b. FIG. 3 shows the floor in both entry chambers is inclined—54a and 54b. The incline floor 54a in entry chamber 40a is to be only enough to create a step down into chamber 40b—approximately 2 or 3 millimeters high would be enough. If the incline is very steep the flies are likely to become suspicious and turn back. Flies readily step down so will progress into chamber 40b. As flies tend to crawl past or around a raised object, such as the step created by incline 54a, they are less likely to retreat from chamber 40b than they were from chamber 40a. Therefore incline floor 54b can be much more steep in chamber 40b which is necessary to achieve the height needed for passageway 44b to be protected by hood 46.

In entry chamber 40b the flies follow chamber partition 42b around until they either go through passageway 44b or bump into diverting baffle 48a or 48b. Flies tend to crawl next to the partitions searching for an exit and when they encounter an obstacle such as a diverting baffle they turn backward or sideways which turns them away from making a possible exit back through passageway 44a. As the flies continue searching for a way out of entry chamber 40b they most likely will soon go through passageway 44b and exit through hood 46 into storage chamber 40c. The hood is connected to the exterior of chamber partition 42b and fits over passageway 44b. It extends approximately 8 millimeters out from passageway 44b. It surrounds the passageway on all sides except toward the window pane, therefore it channels flies toward the back of the trap. Flies readily step down into storage area 40c but since they seldom step up, they rarely escape. They tend to go around, over or under the hood instead of into it. The hood is approximately 6 millimeters from the floor of the trap and a fly that crawls onto the hood tends to step onto the floor instead of turn into the hood. The hood is also effective at night when the light source is most likely coming from the opposite side of the trap. Then the flies tend to congregate in the front part of the trap away from the exit. Entry chambers cover 52 separates the entry chambers from the storage chamber. The trap is to be positioned in the lightest area of the window and at times is subjected to direct sunshine so ventilation holes 55 are provided in housing body 14 for air flow to prevent a trap from getting hotter inside then the surrounding area. Flies tend to avoid entering a hot, stifling atmosphere.

FIG. 4 shows baffle access holes 56a and 56b and how they are formed by the rounded dome 50. The baffle access holes are between the housing body and the upper part of baffles 18a and 18b. The baffle access holes provide a way for insects to travel from storage chamber 40c in the housing into hollow baffles 18a and 18b. This makes the trap capable of holding approximately twice as many flies without increasing the overall size. The hollow baffles are also advantageous because they are more rigid than a narrow, planar baffle and will remain flush with the window pane. The aperture dome 50 provides clearance above the aperture so flies can crawl over aperture flange 38 to continue their way around the chamber wall toward passageway 44a and proceed into captivity.

CONCLUSION, RAMIFICATION AND SCOPE OF INVENTION

While my above description contains many specifics, these should not be construed as limitations on the scope of the invention, but rather as an exemplification of one preferred embodiment and one modified version thereof. Other variations are possible. While the trap as explained above has a combination of a hood and hollow baffles, it is feasible to make an effective trap without the hollow baffles if a consumer does not need the extra storage area. One baffle could be used to guide flies into the trap, however, two are more effective. Diverting baffles could be made in any chamber. Eliminating the diverting baffles is contemplated, but may reduce the number of flies caught.

Fewer chambers in the housing may retain flies but would not be as effective as the present trap. More chambers could be made in the housing. The entry chambers cover could be eliminated and the top of the entry chambers could be provided by the trap front. More than one cleanout hole can be made in the trap or the cleanout hole can be eliminated in a disposable trap. Besides being constructed of plastic, other suitable material such as paper or cloth can be used. The front of the trap can be a removable lid. The lid could be made hinged 26 to the housing body, therefore, the trap could be manufactured in two parts. Several ornamental fronts can interchange on a basic trap. Suction devices, nylon fabric fasteners or any such hangers can also be used to secure the trap to the window pane but would be extra parts to manufacture and assemble. Attractants can be injected into the material used to make the trap if desired. The trap of this invention can also be used to catch roaches and other pests, and when laid with the back on a flat surface such as a shelf or floor the need for adhesive on the trap back is elimiated.

Thus, one of ordinary skill will appreciate the fly trap of the present invention provides a safe, efficient, socially acceptable, cost effective and manufacturably feasible means to alleviate the annoying and unsanitary problem of flies.

Accordingly, the scope of the invention should be determined not by the embodiments illustrated but by the appended claims and their legal equivalents.

I claim:
1. A fly trap for use on a window pane comprising:
   a. a front, a back, said back being a floor for flies, and a housing therebetween, said housing having an entry aperture, and having a hollow baffle outwardly extending from said housing adjacent said entry aperture, wherein said hollow baffle provides fly storage area via a baffle access hole, said baffle access hole connects a storage chamber in said housing to said storage area inside said hollow baffle and said baffle is rigid and guides flies into said entry aperture,
   b. said trap including at least one entry chamber inside said housing, said entry chamber adjacent said storage chamber, said entry chamber having an inclined floor and a partition extending from said floor, said partition having a passageway therethrough, whereby an entering fly will enter said entry chamber through said entry aperture, ascend said inclined floor, pass through said passageway and step down into said storage chamber, wherein said step down hinders fly retreat, c. a securing means on exterior of said floor to secure said trap to said window pane for use.

2. The trap of claim 1, further including a hood in said storage chamber, said hood being connected to exterior of said partition and fits over said passageway, wherein said step down and said hood deter flies from exiting said storage chamber.

3. The trap of claim 1, wherein an overhanging front is connected to said baffle to prevent flies from crawling over said baffle.

4. The trap of claim 1, further including a diverting baffle extending from said partition proximate said passageway for deterring flies from exiting said trap.

5. The trap of claim 1, wherein said front has translucent portions and colored portions, whereby said translucent portions and said colored portions cause said front to have a stained glass design, whereby flies are attracted to and hidden in said trap.

6. A fly trap for use on a window pane comprising:
a. a front, a back, said back being a floor for flies, and a housing therebetween, said housing having an entry aperture, and having a baffle outwardly extending from said housing adjacent said entry aperture, wherein said baffle guides flies into said entry aperture,
b. said trap including at least one entry chamber inside said housing and a storage chamber, said entry chamber having an inclined floor and a partition extending from said floor, said partition having a passageway therethrough, whereby an entering fly will enter said entry chamber through said entry aperture, ascend said inclined floor, pass through said passageway and step down into said storage chamber,
c. said trap having a hood in said storage chamber, said hood being connected to exterior of said partition and fits over said passageway, said passageway having height provided by said inclined floor resulting in said step down, wherein said step down and said hood deter flies from exiting said storage chamber,
d. a securing means on exterior of said floor to secure said trap to said window pane for use.

7. The trap of claim 6, wherein said baffle is hollow, whereby said hollow baffle provides fly storage area via a baffle access hole, said baffle access hole connects a storage chamber in said housing to said storage area inside said hollow baffle and said baffle is rigid and guides flies into said entry aperture.

8. The trap of claim 6, further including perforations in said floor for punching out a hole, said hole providing access to vacuum out said trap.

9. The trap of claim 6, wherein said fly trap is camouflaged as a window ornament, said front having a colorful design, whereby flies are attracted to and hidden in said trap.

10. The trap of claim 6, wherein said trap is manufactured in two integral pieces, whereby allowing it to be available at a marketable price.

* * * * *